(12) United States Patent
Kandipati (10) Patent No.: US 11,544,804 B2
(45) Date of Patent: Jan. 3, 2023

(54) SYSTEM AND METHODS FOR A REAL ESTATE MANAGEMENT PLATFORM AND DYNAMIC SCORING SYSTEM

(71) Applicant: Ashok Kandipati, Folsom, CA (US)

(72) Inventor: Ashok Kandipati, Folsom, CA (US)

( * ) Notice: Subject to any disclaimer, the term of this patent is extended or adjusted under 35 U.S.C. 154(b) by 0 days.

(21) Appl. No.: 17/517,558

(22) Filed: Nov. 2, 2021

(65) Prior Publication Data

US 2022/0138876 A1 May 5, 2022

Related U.S. Application Data

(60) Provisional application No. 63/109,077, filed on Nov. 3, 2020.

(51) Int. Cl.
*G06Q 50/16* (2012.01)
*G06F 3/04817* (2022.01)
*G06F 3/04847* (2022.01)
*G06Q 10/10* (2012.01)

(52) U.S. Cl.
CPC ......... *G06Q 50/16* (2013.01); *G06F 3/04817* (2013.01); *G06F 3/04847* (2013.01); *G06Q 10/1095* (2013.01)

(58) Field of Classification Search
CPC ............................ G06Q 50/16; G06F 3/04817
See application file for complete search history.

(56) References Cited

U.S. PATENT DOCUMENTS

| | | | |
|---|---|---|---|
| 7,640,204 B2 | 12/2009 | Florance | |
| 8,024,349 B1 | 9/2011 | Shao | |
| 9,104,782 B2 | 8/2015 | Visioli | |
| 2007/0067180 A1 | 3/2007 | James | |
| 2011/0087608 A1 | 4/2011 | Shah | |
| 2012/0005109 A1* | 1/2012 | Stinson | G06Q 30/0278 |
| | | | 705/306 |
| 2012/0284202 A1 | 11/2012 | Dalby | |
| 2014/0297479 A1 | 10/2014 | McCloskey | |
| 2016/0048934 A1 | 2/2016 | Gross | |
| 2016/0092959 A1* | 3/2016 | Gross | G06Q 30/0625 |
| | | | 705/26.62 |

FOREIGN PATENT DOCUMENTS

| | | | | |
|---|---|---|---|---|
| WO | WO2007033402 | * | 3/2007 | ............. G06F 17/30 |
| WO | WO2007033402 A1 | | 3/2007 | |
| WO | WO2014160806 A1 | | 10/2014 | |

OTHER PUBLICATIONS

Of Riggs, Back to Basics: Saved Search Emails, Nov. 21, 2011 (Year: 2011).*
Rank Order, https://web.archive.org/web/20201001120409/https://www.questionpro.com/help/drag-and-drop-question-type.html (Year: 2020).*

* cited by examiner

*Primary Examiner* — Aryan E Weisenfeld (57) ABSTRACT

A method for managing a real estate management platform and dynamic scoring system present invention is presented. The present invention will provide a means of dynamically ranking individual criterion prior to the application of said criterion to a listing database. The value of each search criterion relative to any other criterion is infinitely scalable, enabling the value of selected criteria to be near-absolute while other criteria may only contribute to the overall value of a property. This criteria-forming system is proposed to reflect real-world purchasing decisions more accurately by mimicking the internal processes by which a buyer might make value judgements.

9 Claims, 9 Drawing Sheets

Displaying the plurality of search attributes on the user interface device, wherein each of the plurality of search attributes is individually represented by one of a plurality of search sliders, wherein the plurality of search sliders extends along a value range between a minimal value and a maximal value.

Receiving a slider selection for each of the plurality of sliders through the user interface device as the user input, wherein the slider selection corresponds to a specific value along the value range.

Providing a consultant interface device and a scheduling interface, wherein the consultant interface device is communicably coupled with the database server, and wherein the scheduling interface is managed by the database server.

Receiving consultant input from the consultant interface device to define a schedule availability profile through the scheduling interface.

Displaying the schedule availability profile on the user interface device.

Receiving user input from the user interface device to define an appointment profile based on the schedule availability profile through the scheduling interface.

FIG. 7

Displaying the preference-organized set of property profiles as a list on the user interface device.

FIG. 8

Displaying the preference-organized set of property profiles as a grid on the user interface device.

FIG. 9

SYSTEM AND METHODS FOR A REAL ESTATE MANAGEMENT PLATFORM AND DYNAMIC SCORING SYSTEM

The current application claims a priority to the U.S. Provisional Patent application Ser. No. 63/090,077 filed on Nov. 3, 2020.

FIELD OF THE INVENTION

The present invention generally relates to a body of software comprising both graphical and computational elements enabling the presentation and arrangement of real estate listings. More specifically, the presentation and arrangement of various digitized entries within a database based on assigned characteristics and values relating to amenities and qualities of the represented properties.

BACKGROUND OF THE INVENTION

In present times, real estate managers and brokers commonly use online platforms to reach out to prospective clients with various properties available for rent or purchase. Though this is commonly accompanied by an in-person inspection or 'walk-through' or a property before any commitments are made, the online presence enables a broker to passively market their managed properties with minimal time commitment. On the client side, the prospective home buyers and renters are able to peruse any available properties without initially devoting time to visit every site of interest. Browsing results are typically accessed via an attached search portal or database management system, wherein customers may select criteria for the property listings to be filtered against. A conventional search method will elevate the list-position of property listings based on the prevalence of positively matched criteria in each listing or suppress listings that are negatively matched (i.e. lacking targeted criteria). This type of list-sorting method may be adequate for a single search, but individuals are typically more selective in their approach to finding a new home. Before a prospective buyer visits their first property, they are likely to perform dozens if not hundreds of iterative searches. Each search criterion must be repeatedly adjusted to reveal previously suppressed listings that may have been hidden based on a previous search criterion. This shortcoming is typically caused by an individual criterion being represented within the search algorithm as a binary—present or not present—while a prospective buyer may view each criterion with varying degrees of priority. This lack of flexibility ignores the potential for compromise in a purchase decision, e.g. a buyer may accept a longer commute to own a larger property at a lower price or give up some amenities to live in a particularly desirable area.

It is therefore proposed that the present invention will provide a means of dynamically ranking individual criterion prior to the application of said criterion to a listing database. The value of each search criterion relative to any other criterion is infinitely scalable, enabling the value of selected criteria to be near-absolute while other criteria may only contribute to the overall value of a property. This criteria-forming system is proposed to reflect real-world purchasing decisions more accurately by mimicking the internal processes by which a buyer might make value judgements. Operating in parallel to the floating-point criteria, the proposed system may feature automated updates to each listing drawn from various external sources, e.g. community listings, review sites, survey aggregators, etc. The representative values attached to each aspect of a property listing may be updated to reflect this crowdsourced data with a degree of precision that would be impossible for a binary system. The present invention also includes various scheduling and communication tools integrally linked to the rating system, wherein brokers and managers are automatically presented with optimal routes and schedules for performing in-person guided tours of homes based on the criteria provided by the prospective buyer. The finer details of these schedules are ideally organized via a context-based communications system, wherein a manager may view and refine the search criteria for a user in a collaborative process with individual clients.

SUMMARY OF THE INVENTION

The present invention will provide a means of dynamically ranking individual criterion prior to the application of said criterion to a listing database. The value of each search criterion relative to any other criterion is infinitely scalable, enabling the value of selected criteria to be near-absolute while other criteria may only contribute to the overall value of a property. This criteria-forming system is proposed to reflect real-world purchasing decisions more accurately by mimicking the internal processes by which a buyer might make value judgements.

DETAILED DESCRIPTION OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances, and should not be considered to be limiting to the scope of the present invention as a whole.

In reference to FIGS. 1-9, the present invention is a method for managing a real estate management platform and dynamic scoring system. The present invention will provide a means of dynamically ranking individual criterion prior to the application of said criterion to a listing database. The value of each search criterion relative to any other criterion is infinitely scalable, enabling the value of selected criteria to be near-absolute while other criteria may only contribute to the overall value of a property. This criteria-forming system is proposed to reflect real-world purchasing decisions more accurately by mimicking the internal processes by which a buyer might make value judgements.

Figure 1:
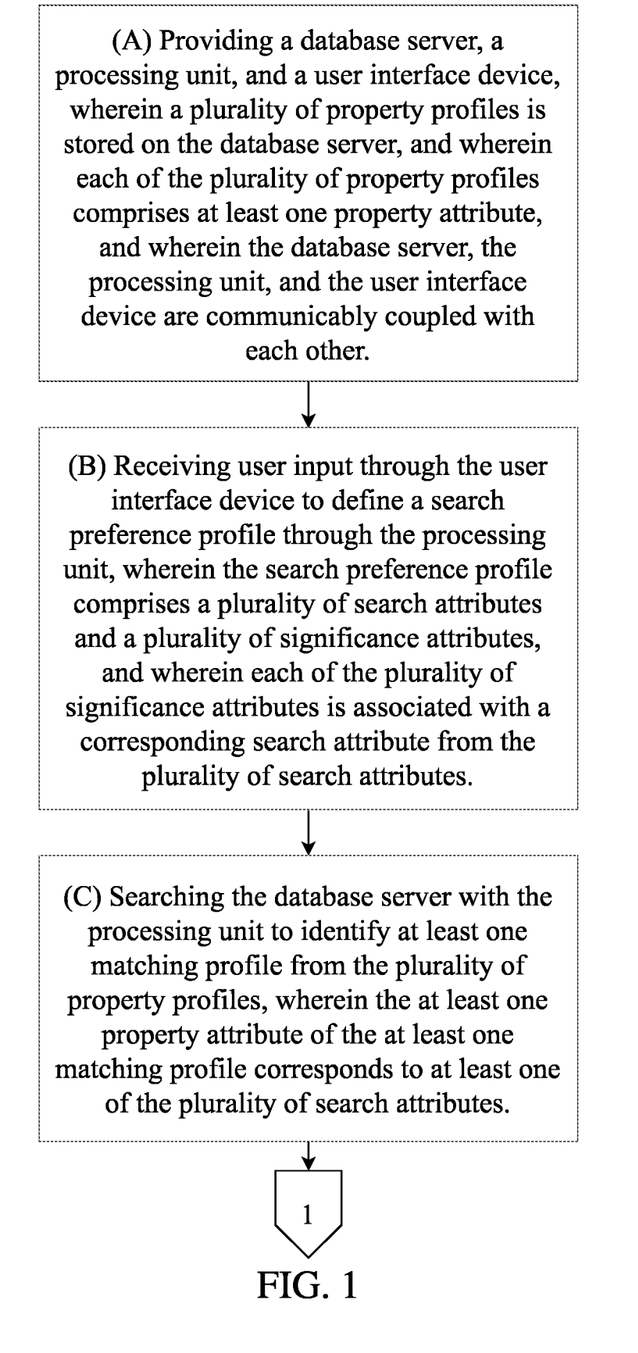
FIG. 1 is a flowchart illustrating overall process for the present invention.

In order to execute the overall process for the method of the present invention, the present invention requires a database server, a processing unit, and a user interface device, wherein a plurality of property profiles is stored on the database server, and where each of the plurality of property profiles comprises at least one property attribute, and wherein the database server, the processing unit, and the user interface device are communicably coupled with each other (Step A), as shown in FIG. 1.

In the preferred embodiment of the present invention, the database server may take the form of any suitable database server sufficient in handling general data transfer between all affiliated parties of the present invention. In the preferred embodiment of the present invention, the database server employs conventional server database equipment, wireless communication devices, memory storage, and any other suitable equipment to operate functions of a conventional database server. In the preferred embodiment of the present invention, the processing unit executes all software application functions affiliated to the present invention. In the preferred embodiment of the present invention, the user interface device may take the form of any suitable device suitable for serving as a control interface to communicate users to the present invention, such as, but not limited to desktop terminals, smartphones, tablets, portable communication devices, kiosks, or any other suitable control interface.

In accordance with the preferred embodiment of the present invention, user input is received through the user interface device to define a search preference profile through the processing unit, where the search preference profile comprises a plurality of search attributes and a plurality of significance attributes, and wherein each of the plurality of significance attributes is associated with a corresponding search attribute from the plurality of search attributes (Step B), as shown in FIG. 1. In the preferred embodiment of the present invention, the search preference profile embodies is derived from initial user input into the present invention. The user will have the option to sign-in to a pre-registered account or continue as a guest. The present invention will inquire the user with the plurality of search attributes and the plurality of significance attributes used to build the search preference profile. This plurality of search attributes and plurality of significance attributes can include but are not limited to number of people moving in, monthly budget, commute time, location-based points of interest, home type, bedrooms, home characteristics, work location, and any other initial inquiries. In the preferred embodiment of the present invention, the plurality of significance attributes may further be refined through the present invention inquiring the importance of the search attribute. These special search attributes may include but are not limited to house characteristic must-haves, drag and drop priorities or any other attributes that can be defined as a significance attribute. In accordance with the preferred embodiment of the present invention, the database server is searched with the processing unit to identify at least one matching profile from the plurality of property profiles, where the at least one property attribute of the at least one matching profile corresponds to at least one of the plurality of search attributes (Step C), as shown in FIG. 1.

Figure 2:
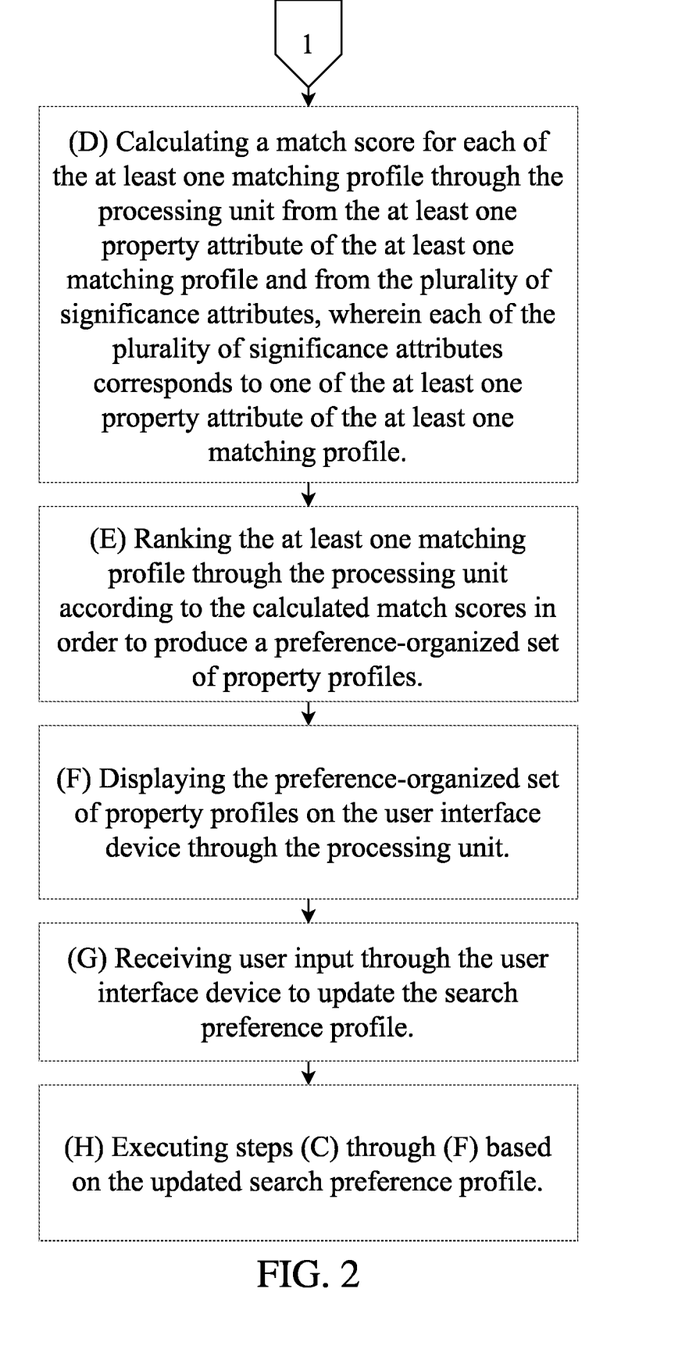
FIG. 2 is a flowchart illustrating continuing the overall process for the present invention from FIG. 1.

In the preferred embodiment of the present invention, the plurality of property profiles may take the form of housing data entries from real estate databases or any other suitable database. In the preferred embodiment of the present invention, the at least one matching profile is generated through matching of the user inputted search preference profile, comparing the plurality of search attributes and the plurality of significance attributes to the plurality of property profiles. The plurality of property profiles represents relevant results that matches with the user inputted search preference profile. In accordance with the preferred embodiment of the present invention, a match score is calculated for each of the at least one matching profile through the processing unit from the at least one property attribute of the at least one matching profile and from the plurality of significance attributes, where each of the plurality of significance attributes corresponds to one of the at least one property attribute of the at least one matching profile (Step D), as shown in FIG. 2. In the preferred embodiment of the present invention, the match score may take the form of a relevance scale for each of the at least one matching profile. In accordance with the preferred embodiment of the present invention, the at least one matching profile is then ranked through the processing unit according to the calculated match scores in order to produce a preference-organized set of property profiles (Step E), as shown in FIG. 2. In accordance with the preferred embodiment of the present invention, the preference-organized set of property profiles is displayed on the user interface device through the processing unit (Step F), as shown in FIG. 2.

Figure 8:
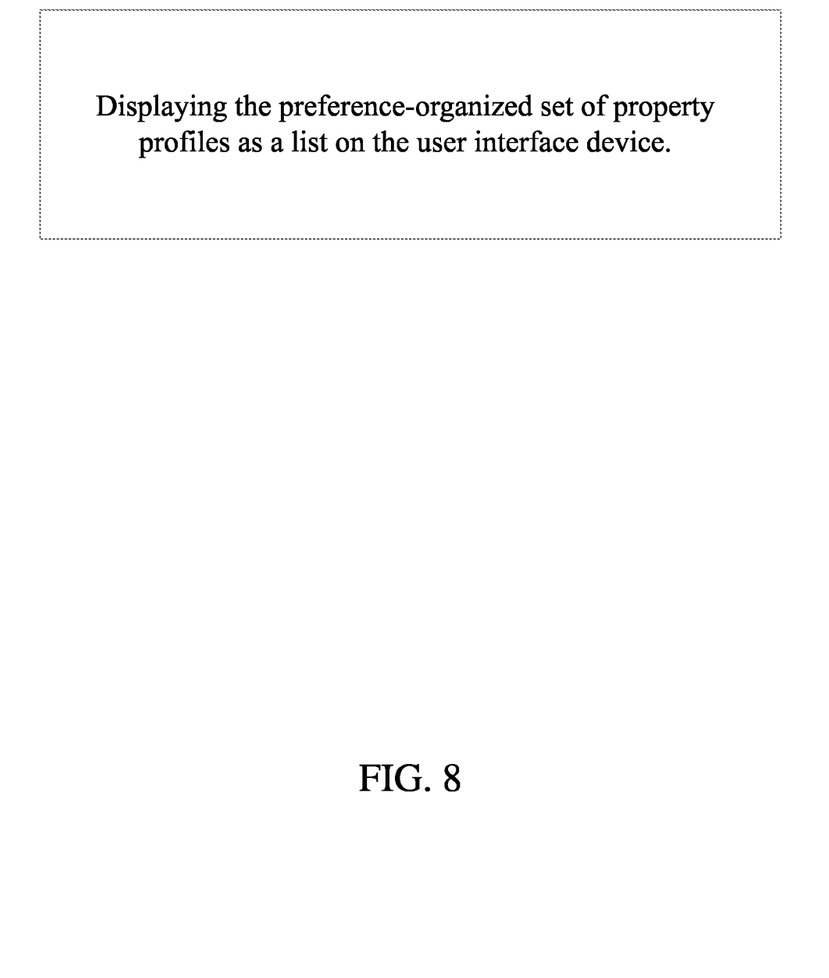
FIG. 8 is a flowchart illustrating the preference-organized set of property profiles as a list.
Figure 9:
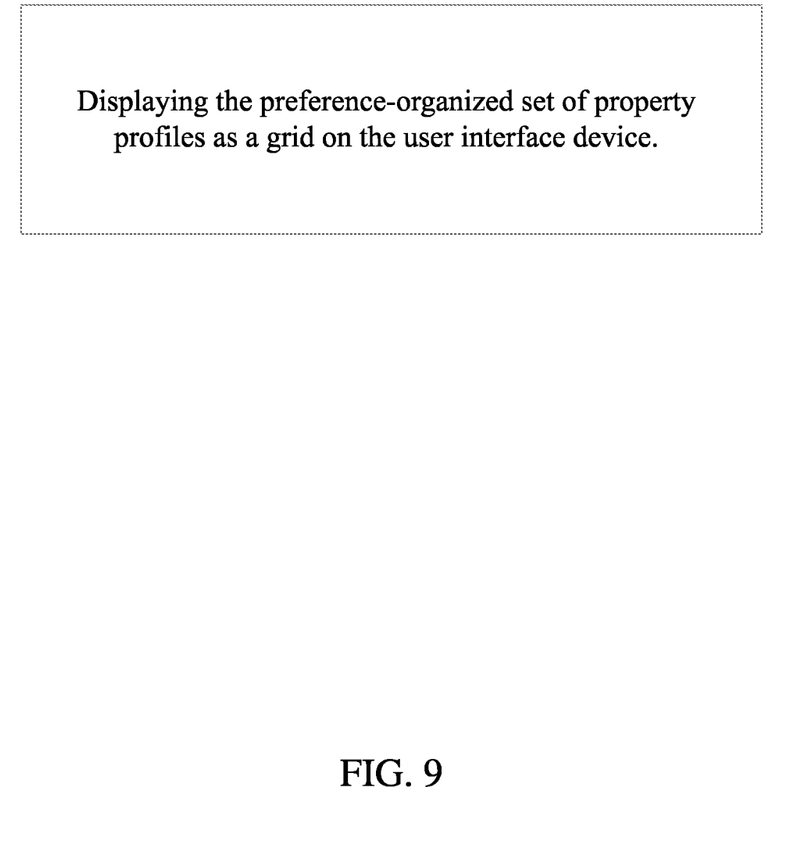
FIG. 9 is a flowchart illustrating the preference-organized set of property profiles as a grid.

In the preferred embodiment of the present invention, the preference-organized set of property profiles represents the most relevant housing results that best match the user's search profile preferences and priorities. Each housing result may display a thumbnail of the house, featured search attributes of the house, location of the house, commute distance or time from the house, or any other suitable preview information that reflects the user's search preference profile. Clicking the housing result will redirect the user to more detailed information about the housing result. In the preferred embodiment of the present invention, the preference-organized set of property profiles can further employ a map overlay displaying the user inputted search attributes, such as displaying points of interests along a map. In accordance with another embodiment of the present invention, the preference-organized set of property profiles is displayed as a list on the user interface device, as shown in FIG. 8. In accordance with the preferred embodiment of the present invention, the preference-organized set of property profiles is displayed as a grid on the user interface device, as shown in FIG. 9. In the preferred embodiment of the present invention, the preference-organized list will correspond to other search functions the present invention may employ, such as, but not limited to rental comparisons, favorites, home profile checklists, location based preferences, and any other search function criteria's.

In accordance with the preferred embodiment of the present invention, user input is then received through the user interface device to update the search preference profile (Step G), as shown in FIG. 2. In accordance with the preferred embodiment of the present invention, steps (C) through (F) are executed based on the updated search preference profile (Step H), as shown in FIG. 2. In the preferred embodiment of the present invention, the user is allowed to go back and change the plurality of search attributes and plurality of significance attributes as any time, where the preference-organized set of property profiles is dynamically updated.

Figure 3:
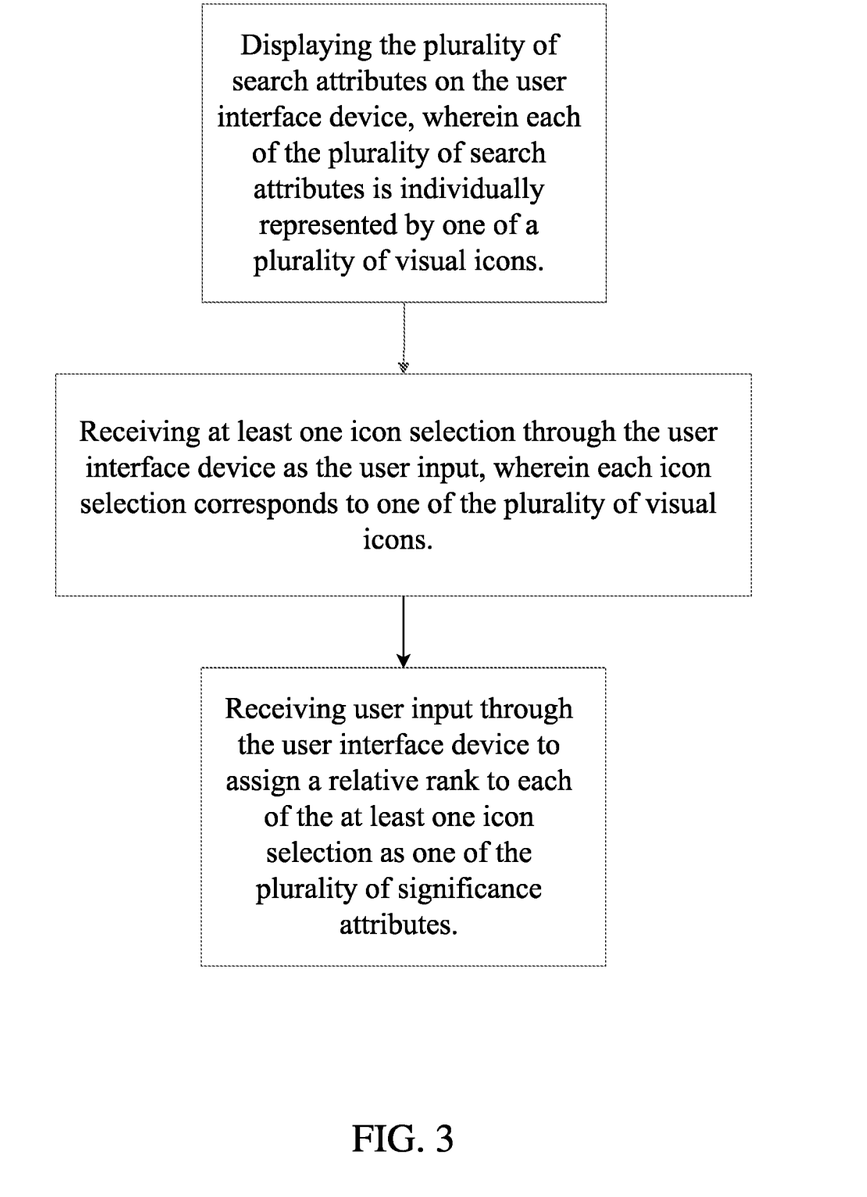
FIG. 3 is a flowchart illustrating the process of receiving user input through the at least one icon selection.
Figure 4:
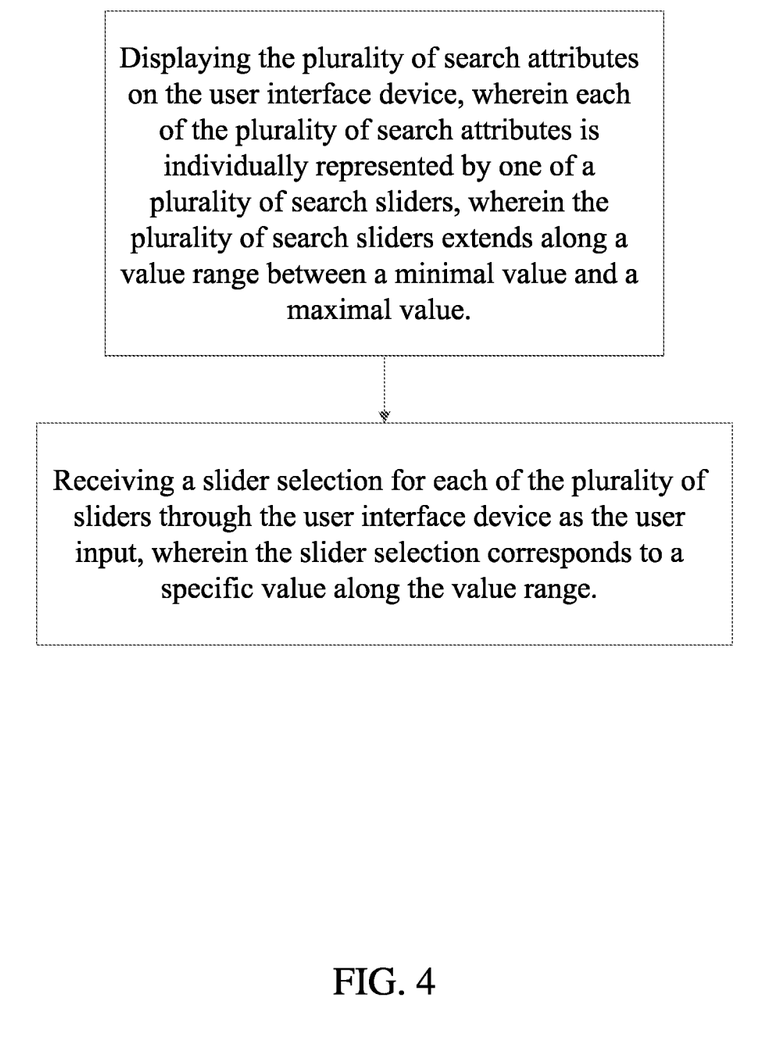
FIG. 4 is a flowchart illustrating the process of receiving user input from each plurality of sliders.
Figure 5:
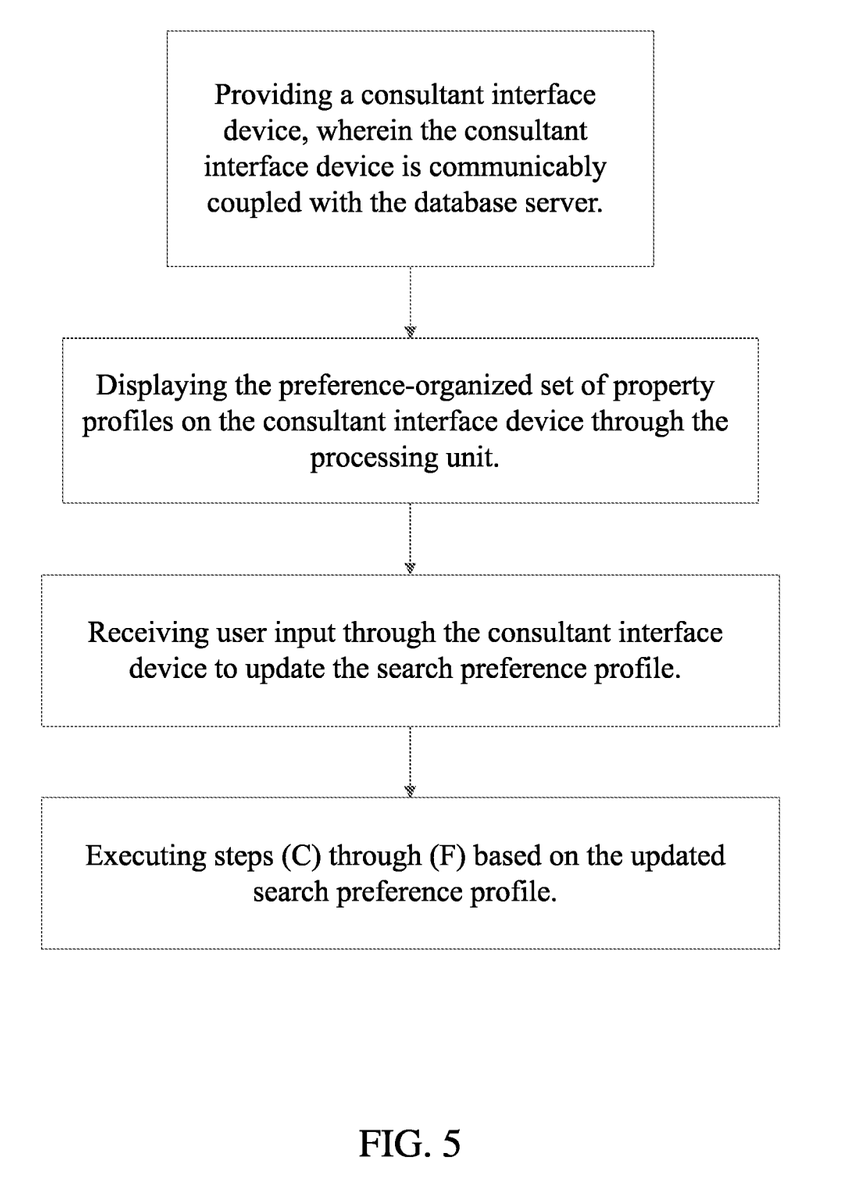
FIG. 5 is a flowchart illustrating the process of providing a consultant interface device that communicates with the present invention.
Figure 6:
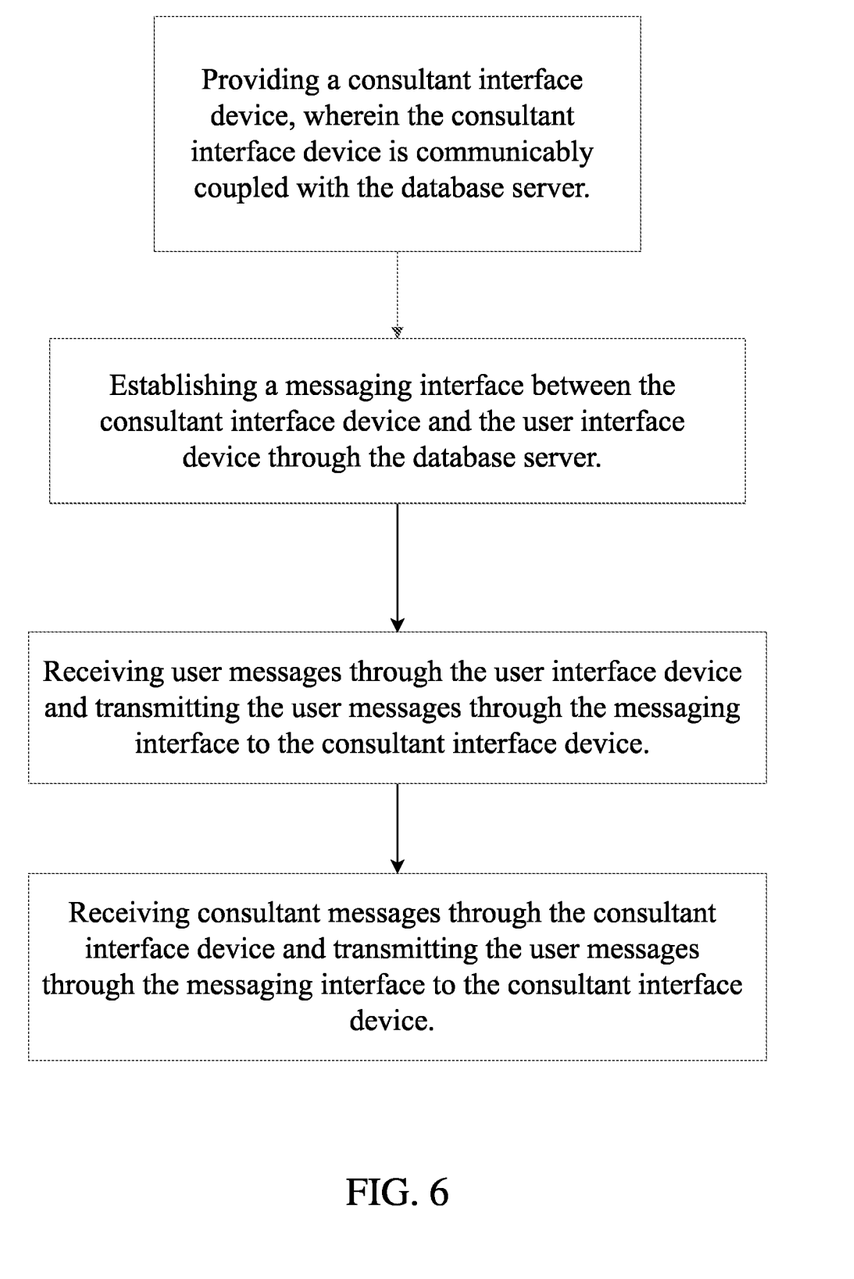
FIG. 6 is a flowchart illustrating the process of providing a messaging interface that allows a user and a consultant to communicate to each other.

In reference to FIG. 3, the plurality of search attributes is displayed on the user interface device, where each of the plurality of search attributes is individually represented by one of a plurality of visual icons. The at least one icon selection is received through the user interface device as the user input, where each icon selection corresponds to one of the plurality of visual icons. The user input is received through the user interface device to assign a relative rank to each of the at least one icon selection as one of the plurality of significance attributes. The use of visual icons generalizes search attributes into popular categories that are usually prioritized, such as, but not limited to home-type, commute, budget, must-haves, and any other popular categories. In reference to FIG. 4, the plurality of search attributes is displayed on the user interface device, where each of the plurality of search attributes is individually represented by one of a plurality of search sliders, where the plurality of search sliders extends along a value range between a minimal value and a maximal value. In accordance with the preferred embodiment of the present invention, a slider selection is received for each of the plurality of sliders through the user interface device as the user input, where the slider selection corresponds to a specific value along the value range.

In the preferred embodiment of the present invention, the use of sliders provides a means of generalizing the specified degree a user scales priority along a certain search attribute such as, but not limited to commute time, must-haves, or any other suitable search attributes. Additionally, the plurality of search sliders can also define a user's priority range along other search attributes, such as budget range of the house, size range of the house, or any other suitable search attributes. In reference to FIG. 5, a consultant interface device is provided, where the consultant interface device is communicably coupled with the database server. The preference-organized set of property profiles is displayed on the consultant interface device through the processing unit. The user input is received through the consultant interface device to update the search preference profile. Steps (C) through (F) are then executed based on the updated search preference profile.

In the preferred embodiment of the present invention, the consultant interface device may take the form of any device suitable for administration control of the present invention. Users of the consultant interface device are identified as super-users that are suitable for influencing changes to better aid in refining the home buyer's search preference profile. Such users may include real estate agents, housing consultants, or any other suitable user. In reference to FIG. 6, the consultant interface device is provided, where the consultant interface device is communicably coupled with the database server. A messaging interface is provided between the consultant interface device and the user interface device through the database server. User messages are transmitted through the user interface device. The user messages are then transmitted through the messaging interface to the consultant interface device. Consultant messages are received through the consultant interface device. The user messages are then transmitted through the messaging interface to the consultant interface device. In the preferred embodiment of the present invention, the homebuyer may use the present invention to communicate with the super-user directly through an on-board messaging application that features live-chat, video, photo, or file sharing implements.

Figure 7:
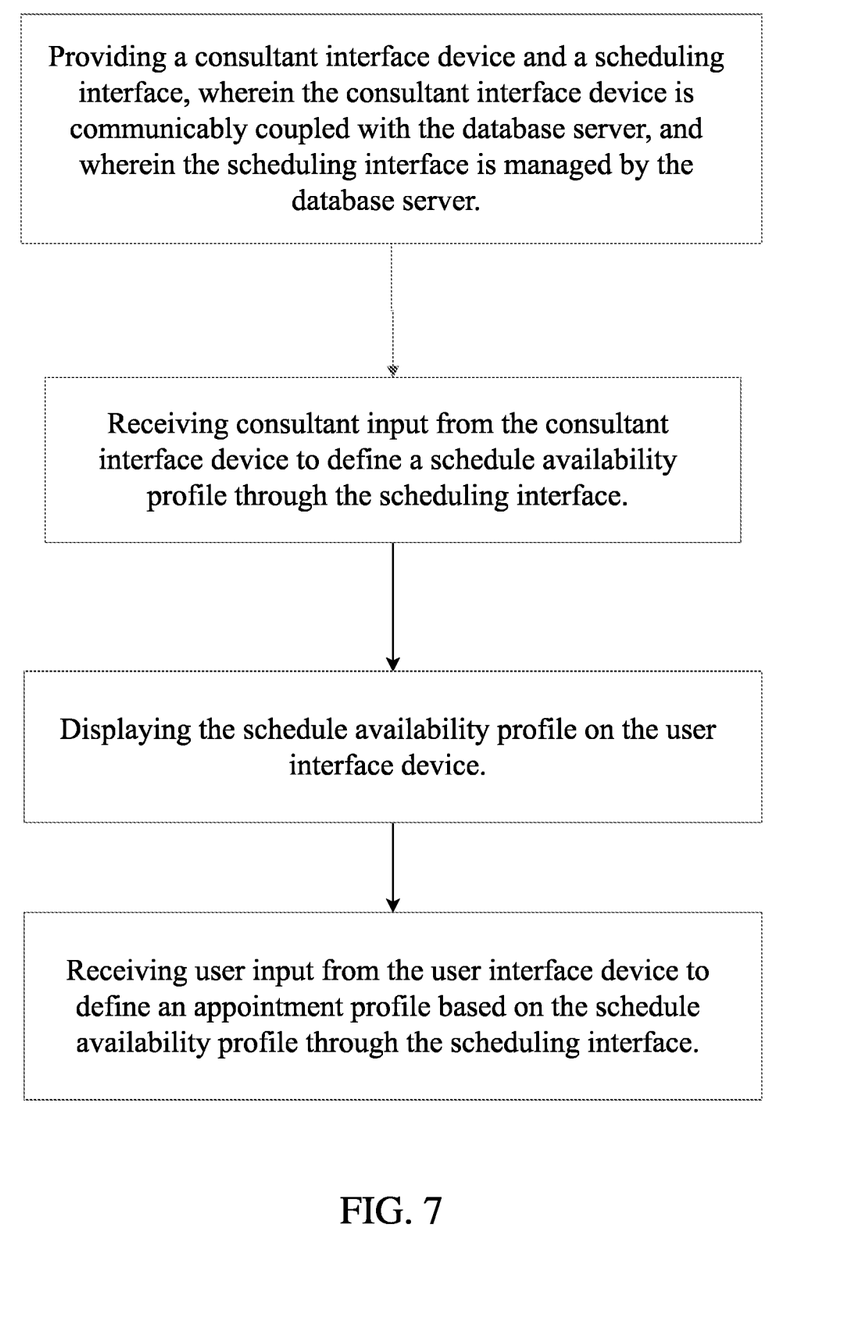
FIG. 7 is a flowchart illustrating the process of providing a consultant interface device to schedule an appointment.

In reference to FIG. 7, a consultant interface device and a scheduling interface are provided, where the consultant interface device is communicably coupled with the database server, and where the scheduling interface is managed by the database server. Consultant input is received from the consultant interface device to define a schedule availability profile through the scheduling interface. The schedule availability profile is displayed on the user interface device. User input is received from the user interface device to define an appointment profile based on the schedule availability profile through the scheduling interface. In the preferred embodiment of the present invention, the homebuyer may use the present invention to communicate with the super-user to schedule an appointment based on availability for both the homebuyer and the super-user.

Although the invention has been explained in relation to its preferred embodiment, it is to be understood that many other possible modifications and variations can be made without departing from the spirit and scope of the invention as hereinafter claimed.

What is claimed is:

1. A method of managing a real estate management platform and dynamic scoring system, the method comprises the steps of:

(A) providing a database server, a processing unit, and a user interface device, wherein a plurality of property profiles is stored on the database server, and wherein each of the plurality of property profiles comprises at least one property attribute, and wherein the database server, the processing unit, and the user interface device are communicably coupled with each other;

(B) receiving user input through the user interface device to define a search preference profile through the processing unit, wherein the search preference profile comprises a plurality of search attributes and a plurality of significance attributes, and wherein each of the plurality of significance attributes is associated with a corresponding search attribute from the plurality of search attributes;

(C) searching the database server with the processing unit to identify at least one matching profile from the plurality of property profiles after step (B), wherein the at least one property attribute of the at least one matching profile corresponds to at least one of the plurality of search attributes received in step (B);

(D) calculating a match score for each of the at least one matching profile identified in step (C) through the processing unit from the at least one property attribute of the at least one matching profile and from the plurality of significance attributes after step (C), wherein each of the plurality of significance attributes corresponds to one of the at least one property attribute of the at least one matching profile;

(E) ranking the at least one matching profile through the processing unit according to the match scores calculated in step (D) in order to produce a preference-organized set of property profiles after step (D);

(F) displaying the preference-organized set of property profiles produced in step (E) on the user interface device through the processing unit after step (E);

(G) repeating step (B) by receiving another user input through the user interface device to update the search preference profile;

(H) repeating steps (C) through (F) based on the search preference profile updated in step (G);

displaying the plurality of search attributes on the user interface device, wherein each of the plurality of search attributes is graphically summarized by one of a plurality of visually-representative icons;

receiving each of at least one icon selection at a selected drag-and-drop interface position through the user interface device as the user input, wherein each icon selection corresponds to one of the plurality of visually-representative icons, and wherein the selected drag-and-drop interface position corresponds to one of the plurality of significance attributes, and wherein each significance attribute is associated to a specific drag-and-drop interface position on the user interface device;

displaying the plurality of search attributes on the user interface device, wherein each of the plurality of search attributes is individually represented by one of a plurality of search sliders, wherein the plurality of search sliders extends along a value range between a minimal value and a maximal value; and receiving a slider selection for each of the plurality of sliders through the user interface device as the user input, wherein the slider selection corresponds to a specific value along the value range;

providing a consultant interface device, wherein the consultant interface device is communicably coupled with the database server, wherein the consultant interface device does not initially have regular access to the preference-organized set of property profiles;

relaying the preference-organized set of property profiles from the processing unit, through the database server, and to the consultant interface device;

displaying the preference-organized set of property profiles on the consultant interface device through the processing unit;

repeating step (B) by receiving another user input through the consultant interface device to update the search preference profile;

repeating steps (C) through (F) based on the updated search preference profile;

providing a plurality of common user tasks managed by the processing unit;

comparing the at least one property attribute of at least one selected profile to each common user task with the processing unit in order to identify at least one matching task from the plurality of common user tasks;

compiling the at least one matching task into a user to-do list with the processing unit; and displaying the user to-do list with the user interface device.

2. The method of managing a real estate management platform and dynamic scoring system as claimed in claim 1 comprises the step of:

receiving user input through the user interface device to assign a relative rank to each of the at least one icon selection as one of the plurality of significance attributes.

3. The method of managing a real estate management platform and dynamic scoring system as claimed in claim 1 comprises the steps of:

establishing a messaging interface between the consultant interface device and the user interface device through the database server;

receiving user messages through the user interface device and transmitting the user messages through the messaging interface to the consultant interface device; and receiving consultant messages through the consultant interface device and transmitting the user messages through the messaging interface to the consultant interface device.

4. The method of managing a real estate management platform and dynamic scoring system as claimed in claim 1 comprises the steps of:

providing a scheduling interface, wherein the scheduling interface is managed by the database server;

receiving consultant input from the consultant interface device to define a schedule availability profile through the scheduling interface;

displaying the schedule availability profile on the user interface device; and receiving user input from the user interface device to define an appointment profile based on the schedule availability profile through the scheduling interface.

5. The method of managing a real estate management platform and dynamic scoring system as claimed in claim 1 comprises the step of:

displaying the preference-organized set of property profiles as a list on the user interface device.

6. The method of managing a real estate management platform and dynamic scoring system as claimed in claim 1 comprises the step of:

displaying the preference-organized set of property profiles as a grid on the user interface device.

7. The method of managing a real estate management platform and dynamic scoring system as claimed in claim 1 comprises the steps of:

receiving at least one rating for the at least one matching profile from at least one external review website with the processing unit after step (C); and displaying the at least one rating for the at least one matching profile with the user interface device before step (G).

8. The method of managing a real estate management platform and dynamic scoring system as claimed in claim 1 comprises the steps of:

providing each profile from the preference-organized set of property profiles with a physical address;

providing a plurality of selected profiles from the preference-organized set of property profiles with a scheduled showing;

generating an optimized itinerary with the processing unit based on the physical address and the scheduled showing for each selected profile; and displaying the optimized itinerary with the display interface device.

9. The method of managing a real estate management platform and dynamic scoring system as claimed in claim 8 comprises the steps of:

providing access to at least one external transportation service; and scheduling at least one appointment with the at least one external transportation service with the processing unit based on the optimized itinerary.

* * * * *